United States Patent [19]

Kim

[11] Patent Number: 5,164,846
[45] Date of Patent: Nov. 17, 1992

[54] DOCUMENT GAP DETECTING DEVICE FOR USE IN FACSIMILE

[75] Inventor: Moon T. Kim, SooWon, Rep. of Korea

[73] Assignee: Goldstar Co. Ltd., Rep. of Korea

[21] Appl. No.: 526,604

[22] Filed: May 22, 1990

[30] Foreign Application Priority Data

May 30, 1989 [KR] Rep. of Korea ............... 7189/1989

[51] Int. Cl.⁵ .................................... H04N 1/02
[52] U.S. Cl. .................................... 358/488; 358/498; 358/474; 271/258; 271/265; 271/270
[58] Field of Search ............. 358/400, 401, 408, 474, 358/486, 487, 491, 492, 494, 496, 497, 498, 488, 449; 355/41, 309; 271/258, 265, 270; 250/206, 206.1, 557

[56] References Cited

U.S. PATENT DOCUMENTS 5,001,577  3/1991  Lee ............................. 358/498

FOREIGN PATENT DOCUMENTS

| | | | |
|---|---|---|---|
| 0069384 | 1/1983 | European Pat. Off. | 358/498 |
| 0055316 | 5/1979 | Japan | 358/474 |
| 0065058 | 4/1982 | Japan | 358/498 |
| 0111563 | 7/1983 | Japan | 358/498 |
| 0047553 | 3/1985 | Japan | 358/474 |
| 62-43258 | 2/1987 | Japan . | |
| 62-166648 | 7/1987 | Japan . | |
| 63-314964 | 12/1988 | Japan . | |
| 64-12668 | 1/1989 | Japan . | |

Primary Examiner—Edward L. Coles, Sr.
Assistant Examiner—Jerome Grant, II

[57] ABSTRACT

A document gap detecting device for facsimile is disclosed in which the bottom plate is formed in a stepped shape, and the linear speeds of an ADF roller and a carrying roller are designed to be same, thereby making it possible to produce a gap between the continuously fed document sheets without requiring a difference between the linear speeds of the ADF roller and the carrying roller. There are further provided with transmitting and receiving optical sensors. According to the present invention, there will occur no undesirable phenomenon such that the sheet at the receiving end is outputted in an extended length.

9 Claims, 2 Drawing Sheets

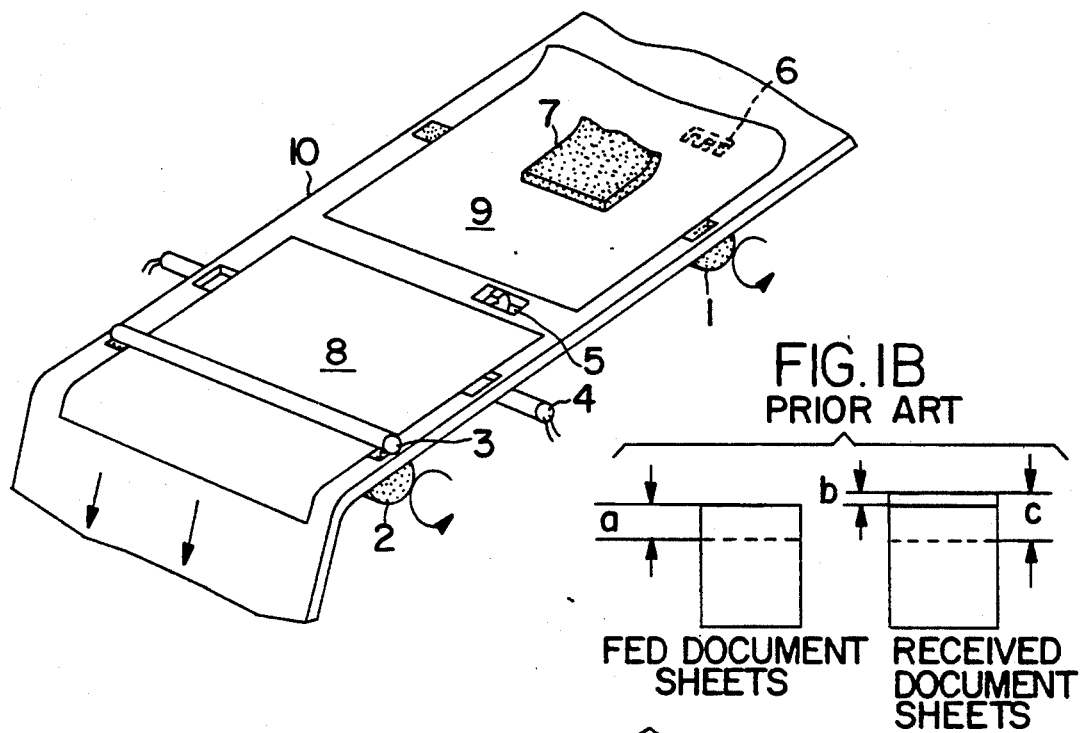
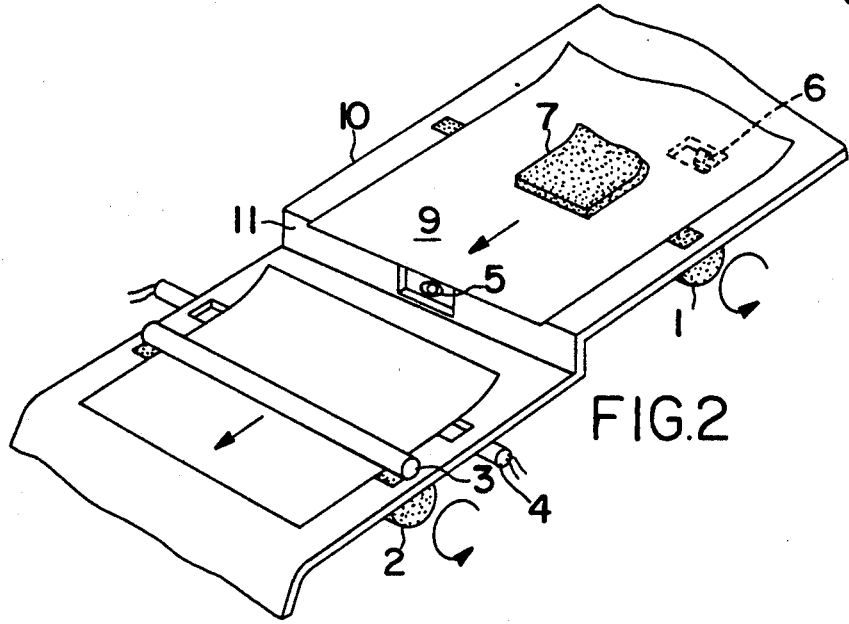

DOCUMENT GAP DETECTING DEVICE FOR USE IN FACSIMILE

FIELD OF THE INVENTION

The present invention relates to a facsimile document conveying device, and particularly to a facsimile document conveying device which is capable of producing gaps between the document sheets in the case of feeding a plurality of document sheets.

BACKGROUND OF THE INVENTION

As shown in the perspective view of FIG. 1, the prior art document conveying method at the transmitting end is carried out using a device constituted such that an ADF (automatic document feeding) roller 1, a carrying roller 2 and a document detecting device 5 are installed on a document guiding bottom plate 10 having a flat face, the automatically fed document sheets being thus conveyed along the flat face of the bottom plate 10.

To generate gaps between the continuously fed document sheets, the prior art device of FIG. 1 is designed such that the linear speed of the ADF roller 1 should be slower than the linear speed the carrying roller 2. That is, the linear velocity $V_A$ of the ADF roller 1 as against the linear velocity $V_F$ of feeding roller 2 is set to have the following relationship; $V_F > V_A$.

Therefore, during the time when a document sheet 8 and a document sheet 9 which are continuously fed are being conveyed along the bottom plate 10, if the leading edge and the trailing edge of the two document sheets arrive at the position of the document gap detecting device 5, there is produced a gap between the two document sheets, owing to the difference between the linear velocities of the two document sheets.

Here, the two document sheets are discriminated by the function of the document gap detecting devices 5. That is, in order to discriminate the two document sheets which are continuously fed without gap, the document gap detecting device and the two rollers having different linear velocities are used, while the document gap discriminating device operates only when there is a gap between the two document sheets, the gap being obtained by providing a difference in the linear velocities of the two rollers. According to the standard, the document scanning speed corresponds with the linear velocity of the carrying roller.

However, during the feeding of the document sheet, the document sheet is carried by the ADF roller 1 until the leading edge of the document sheet arrives at the carrying roller.

Meanwhile, although the linear velocity of the ADF roller 1 is designed to be slower than the linear velocity of the carrying roller in order to generate gaps between the document sheets, the scanning speed of the lamp 4 is designed to be same as the linear velocity of the feeding roller 2, and therefore, the scanning speed becomes slower as much as the difference between the linear velocities of the two rollers during the time when the document sheet moves between the scanning starting point and the carrying roller 2. Therefore, of the whole surface of the transmitting document sheet, the portion a which is scanned at a speed the same as the linear velocity of the ADF roller is received to the receiving end with an extended length b as shown in FIG. 1B, and therefore, the received sheet is out off in a changed length c.

SUMMARY OF THE INVENTION

The present invention is intended to overcome the above described disadvantaged of the conventional device.

Therefore, it is the object of the present invention to provide a facsimile document feeding device in which a document guide having a step shaped coutour is installed at the transmitting end of the facsimile, so that, when a plurality of document sheets are fed automatically and continuously, the linear velocities of the ADF roller and the carrying roller should be same as each other, and at the same time, a gap should be produced between two continuously fed document sheets.

BRIEF DESCRIPTION OF THE DRAWINGS

The above object and other advantages of the present invention will become more apparent by describing in detail the preferred embodiment of the present invention with reference to the attached drawings in which:

FIG. 1A is a perspective view showing the conventional gap detecting method in which a plurality of document sheets are being fed;

FIG. 1B illustrates a state of the receiving end seen in the conventional document gap detecting method;

FIG. 2 is a perspective view showing the document gap detecting device according to the present invention;

DESCRIPTION OF THE PREFERRED EMBODIMENT

Figure 3A:
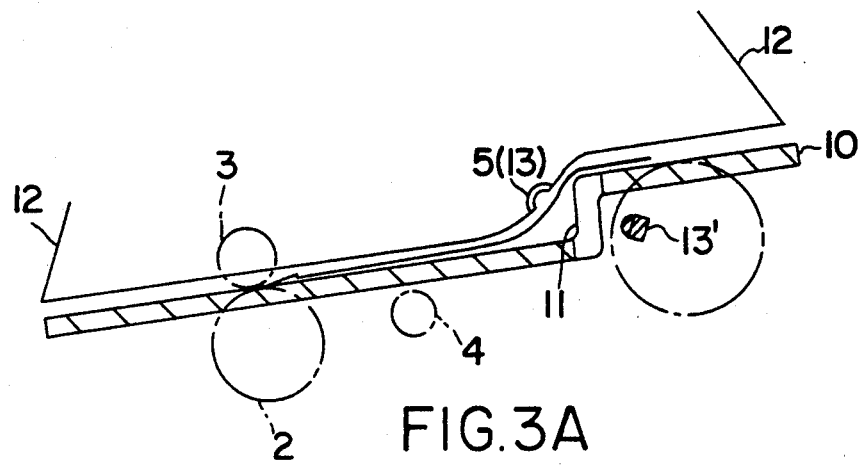
FIG. 3A is a sectional view showing a state before the generation of a document gap in the document gap detectting device of the present invention.
Figure 3B:
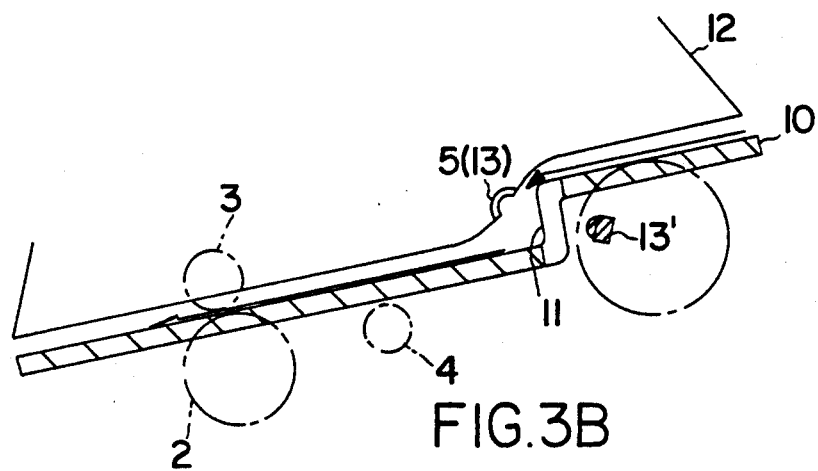
FIG. 3B is a sectional view showing a state after the generation of a document gap in the document gap detecting device of the present invention.

FIG. 2 is a perspective view showing the document gap detecting device of the present invention, while FIGS. 3A and 3B are sectional views showing the internal mechanism of the device of the present invention. If a plurality of document sheets are fed in the usual manner, the contents of the information of the document are scanned by a lamp, and the scanned contents of the information are transmitted by the facsimile to the receiving end.

In such a facsimile, contrary to the conventional flat plane structure of the conventional bottom plate 10, the bottom plate 10, of the present invention is constituted in a stepped form. The vertical portion 11 of the step shaped bottom plate 10 is let to have a hole, and an RP sensor 5 is installed in the hole in such a manner that the RP sensor 5 should be exposed to the outside in the same way as that of an ADF sensor 6.

The higher portion of the bottom plate 10 positioned to the right of the vertical portion 11 of the bottom plate 10 is provided with an ADF roller 1, and ADF rubber 7 and an ADF sensor 6, while the lower portion of the bottom plate 10 positioned to the left of the vetical portion 11 of the bottom plate 10 is provided with a lamp 4, a carrying roller 2, and a punch roller 3. Here, it is required that the linear velocity of the ADF roller 1 and that of the carrying roller 2 are made to be the same as each other, that is, they are let to revolve at a speed producing that effect.

Further, the device of the present invention is provided with optical sensor 13, 13', and the transmitting section of the sensor is attached to the main body of the facsimile, while the receiving section of the sensor is installed on a cover 12, so that the direction of the sensor units should correspond each other.

Meanwhile, in order to make the document gaps sufficiently detected, the angle $\theta$ between the optical direction and the direction of the vertical portion of the bottom plate 10 is let to be formed as shown in FIG. 3B. The device of the present invention constituted as above will now be described as to its operations.

As shown in FIG. 3A, during the time when the document sheet 8 moves toward the carrying roller 2 after passing the ADF roller 1 and the ADF rubber 7, the sheet 8 is carried by the ADF roller 1. Under this condition, the linear speed of the ADF roller 1 is same as that of the carrying roller 2, which is the standard speed. Therefore, the document sheet 8 moves in a state without producing any gap between the trailing edge of the document sheet 8 and the leading edge of the document sheet 9.

However, when the trailing edge of the document sheet 8 and the leading edge of the document sheet 9 arrive at the vertical portion 11 of the bottom plate 10, the trailing edge of the sheet 8 drops to the lower face of the bottom plate 10, while the leading edge of the sheet 9 remains on the higher face of the bottom plate 10, with the result that there is naturally produced a gap between the sheets 8,9.

Figure 4:
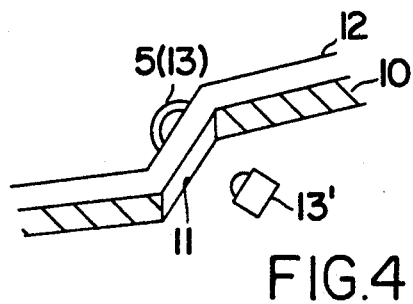
FIG. 4 illustrates another embodiment of the device of the present invention.

Accordingly, the device of the present invention assured that a gap is produced between two continuously fed document sheets, without giving any difference between the linear velocities of the ADF roller 1 and the carrying roller 2. Further, the vertical portion 11 of the bottom plate 10 can be formed in a sloped form as shown in FIG. 4.

According to the present invention, the carrying speeds of the ADF roller and the carrying roller are same each other, and therefore, the scanning speed is also same, with the result that there will occur no phenomenon such that the sheet is received at the receiving end in an extended length.

What is claimed is:

1. A document gap detecting device for facsimile comprising: and ADF roller, a carrying roller and a bottom plate, characterized in that said ADF roller and said carrying roller are let to revolve to produce a same linear speed, said bottom plate is provided with a stepped shape defined by a first bottom plate portion adjacent the ADF roller, a second bottom plate portion spaced from the first bottom plate portion and adjacent the carrying roller and a stepped portion angularly aligned to the first and second bottom plate portions and extending therebetween, and there are further provided transmitting and receiving optical sensors disposed for detecting a gap between documents passing the stepped portion of the bottom plate.

2. A document gap detecting device for facsimile as claimed in claim 1, wherein the stepped portion of said plate is substantially vertically aligned.

3. The document gap detecting device for facsimile as claimed in claim 1 wherein the stepped portion is substantially perpendicular to the first and second bottom plate portions.

4. The document gap detecting device for facsimile as claimed in claim 1 wherein the first and second bottom plate portions are substantially parallel to one another.

5. The document gap detecting device for facsimile as claimed in claim 1 wherein the transmitting and receiving optical sensors are disposed substantially adjacent the stepped portion of the bottom plate.

6. A document gap detecting device for feeding documents in a facsimile machine and for detecting gaps between the documents being fed, said device comprising: an ADF roller rotatably driven for feeding the documents at a selected linear speed, a carrying roler rotatably driven for carrying the documents at the selected linear speed, a first bottom plate portion adjacent the ADF roller and defining a surface along which the documents advance, a second bottom plate portion adjacent the carrying roller and defining a surface along which the documents advance, the second bottom plate portion being offset from and disposed lower than the first bottom plate portion, such that documents being fed successively drop from the first bottom plate portion to the second bottom plate portion, and optical sensor means disposed intermediate the first and second bottom plate portions for detecting gaps intermediate the documents beig fed from the first bottom plate portion to the second bottom plate portion.

7. A document gap detecting device as in claim 6 wherein the bottom plate further comprises a stepped portion extending angularly between the first and second bottom plate portions.

8. A document gap detecting device as in claim 7 wherein the first and second bottom plate portions are substantially parallel.

9. A document gap detecting device as in claim 8 wherein the stepped portion of the bottom plate is aligned substantially perpendicular to the first and second bottom plate portions.

* * * * *